United States Patent [19]
Uehara

[11] 4,444,856
[45] Apr. 24, 1984

[54] BATTERY FOR VEHICLE

[75] Inventor: Mitsuru Uehara, Saitama, Japan

[73] Assignee: Honda Giken Kogyo Kabushiki Kaisha, Saitama, Japan

[21] Appl. No.: 409,804

[22] Filed: Aug. 20, 1982

[30] Foreign Application Priority Data

Aug. 20, 1981 [JP] Japan .............................. 56-123489[U]

[51] Int. Cl.³ .............................................. H01M 2/02
[52] U.S. Cl. ..................................... 429/163; 429/176
[58] Field of Search ................. 429/163, 176, 186, 96, 429/100

[56] References Cited

U.S. PATENT DOCUMENTS 1,197,022  9/1916  Gallagher ........................... 429/176
4,237,202  12/1980  Karpal ............................ 429/163 X Primary Examiner—Anthony Skapars
Attorney, Agent, or Firm—Sughrue, Mion, Zinn, Macpeak and Seas

[57] ABSTRACT

In a battery of a vehicle such as motorcycle, the bottom is indented at both ends in the longitudinal direction; i.e., with respect to both end portions, in the longitudinal direction of the bottom, the middle portion protrudes downwardly, so that the battery is more advantageously accommodated in the triangular space formed by the motorcycle frame.

8 Claims, 5 Drawing Figures

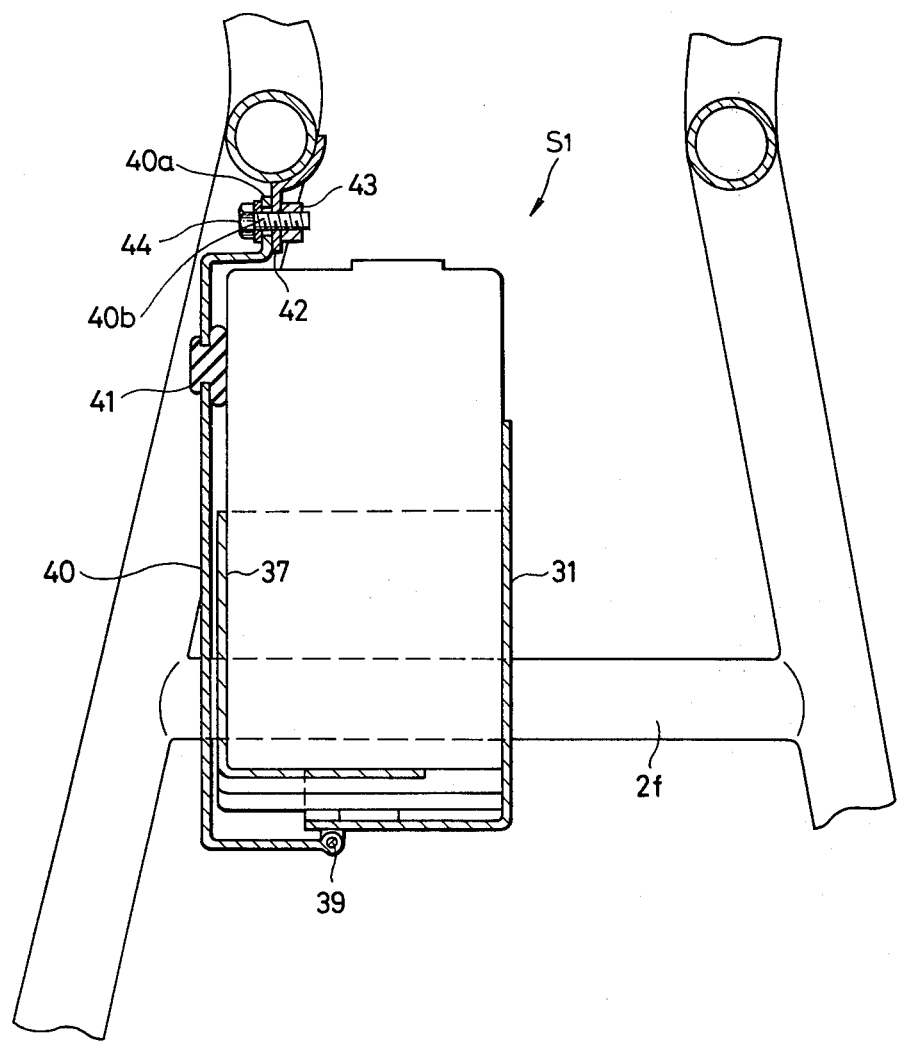

BATTERY FOR VEHICLE

BACKGROUND OF THE INVENTION

This invention relates to an improvement in a battery of the type which is loaded on a vehicle such as a motorcycle.

A battery is conventionally loaded, as an electric power source, on most vehicles. Since a conventional lead battery is a parallelepiped, the following difficulties are involved when the battery is loaded on a motor cycle:

In general, in a motorcycle, the battery is accommodated in the inverted-triangular space which is formed by the frame. Since the battery is a parallelepiped and supports for the battery are provided on the frame members, both ends of the flat bottom of the battery must be supported, and there is provided a large V-shaped spaced below the battery. In other words, as the battery is a parallelepiped, it occupies a relatively large space, with the result that the frame height is increased and accordingly the vehicle height is increased. Accordingly, the conventional battery is an obstruction when it is required to reduce the frame height and accordingly the vehicle height. Furthermore, the presence of the battery limits the layout of other components, and the use of the battery limits the effective utilization of the space on the vehicle.

SUMMARY OF THE INVENTION

Accordingly, an object of this invention is to eliminate the above-described various difficulties accompanying the use of a conventional battery on a vehicle such as a motorcycle.

The foregoing object and other objects as well as the characteristic features of the present invention will become more apparent from the following detailed description when read in conjunction with the accompanying drawings.

BRIEF DESCRIPTION OF THE DRAWINGS

In the accompanying drawings:

FIGS. 3 through 5 are a longitudinal sectional view, a plan view and a longitudinal front view, respectively, of the battery supporting means.

DETAILED DESCRIPTION OF THE PREFERRED EMBODIMENTS

One preferred embodiment of this invention will be described with reference to the accompanying drawings.

Figure 1:
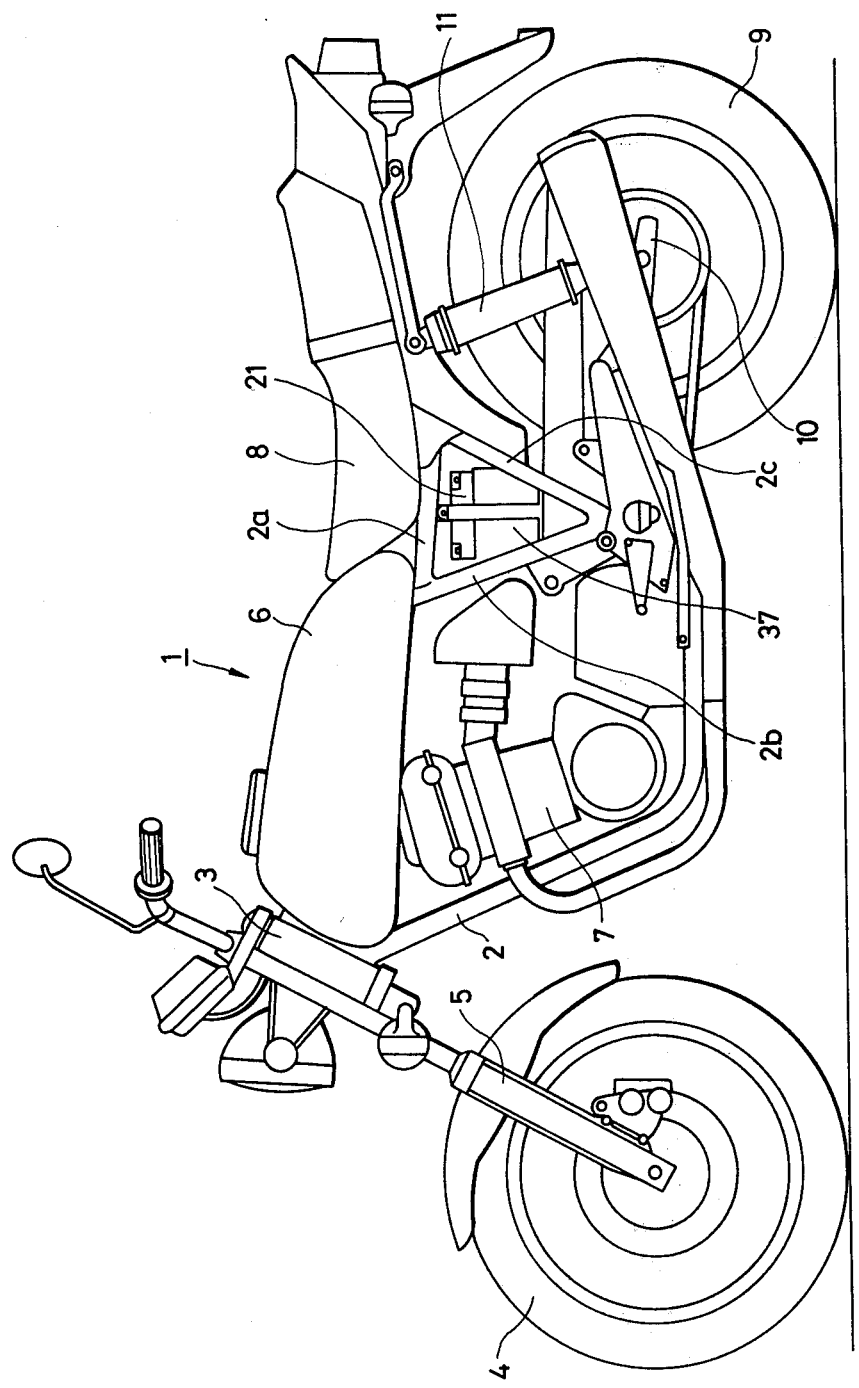
FIG. 1 is a side view of a motorcycle equipped with a battery according to this invention.
Figure 2:
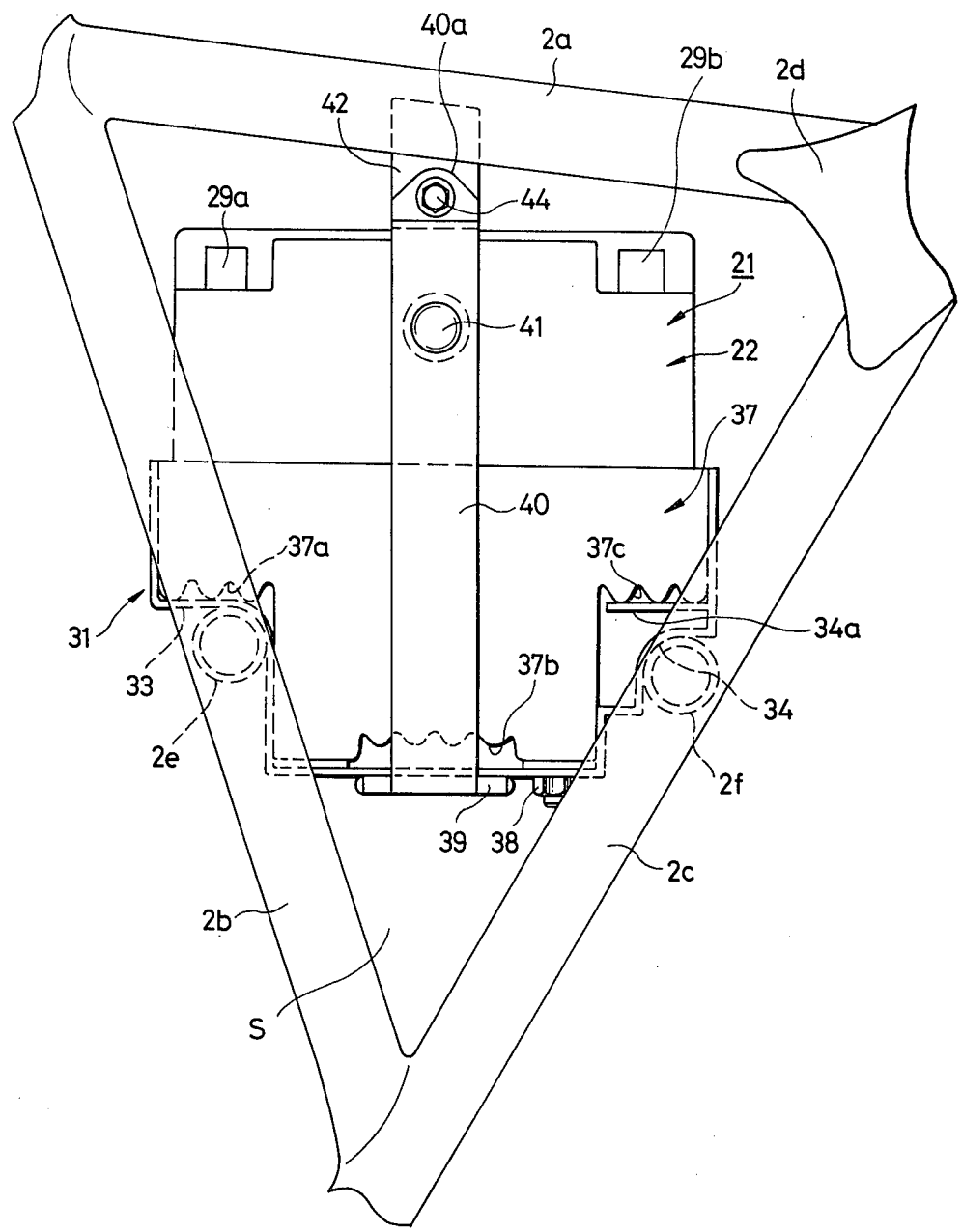
FIG. 2 is a side view showing the external appearance of a battery supporting means.

FIG. 1 is a side view outlining a motorcycle. A front fork 5 supporting a front wheel 4 is pivotally supported by a head tube 3 which is provided at the front end of the frame 2 of the motorcycle 1. A fuel tank 6 is mounted on the front part of the frame 2, and an engine 7 is loaded below the fuel tank 6. A seat 8 is provided behind the fuel tank 6. A rear fork 10 supporting a rear wheel 9 is pivotally mounted on the rear part of the frame. A rear cushion unit 11 is interposed between the rear fork 10 and the rear part of the frame.

A triangular space (an inverted-triangular shape as viewed from the side) S is formed by three members 2a, 2b and 2c at the rear of the engine 7, in front of the rear wheel 9 and below the seat 8, as shown in FIG. 1. This space is provided on each side of the vehicle. Both ends of the member 2a are joined with the upper ends of the members 2b and 2c, respectively. The lower ends of the members 2b and 2c are joined together in the form of a "V". A bracket (not shown) is provided below the member 2c, to pivotally support the front end of the rear fork 10. A rear member 2d extends backwardly from the joint of the upper end of the member 2c and the rear end of the member 2a.

Figure 3:
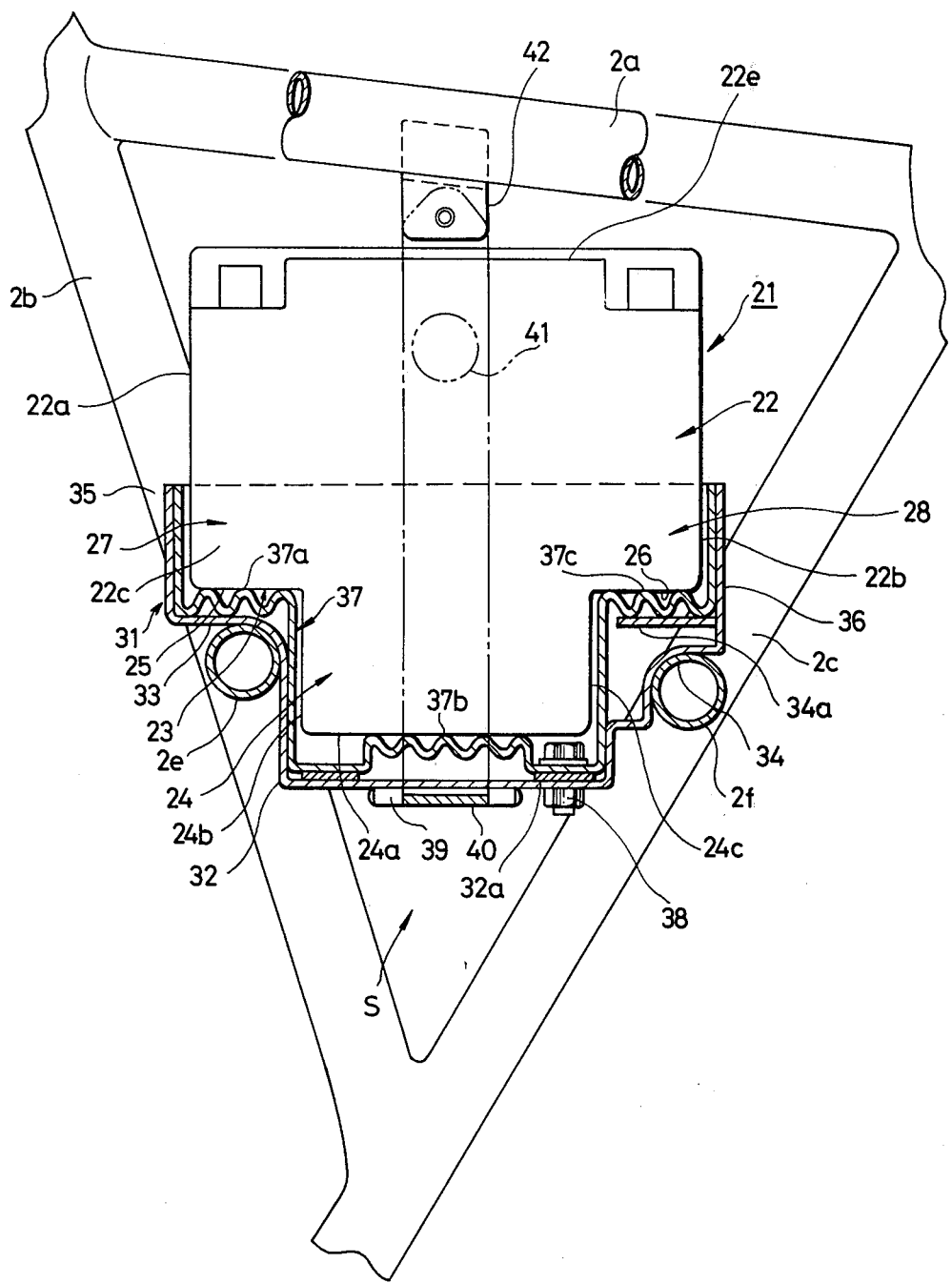
Figure 4:
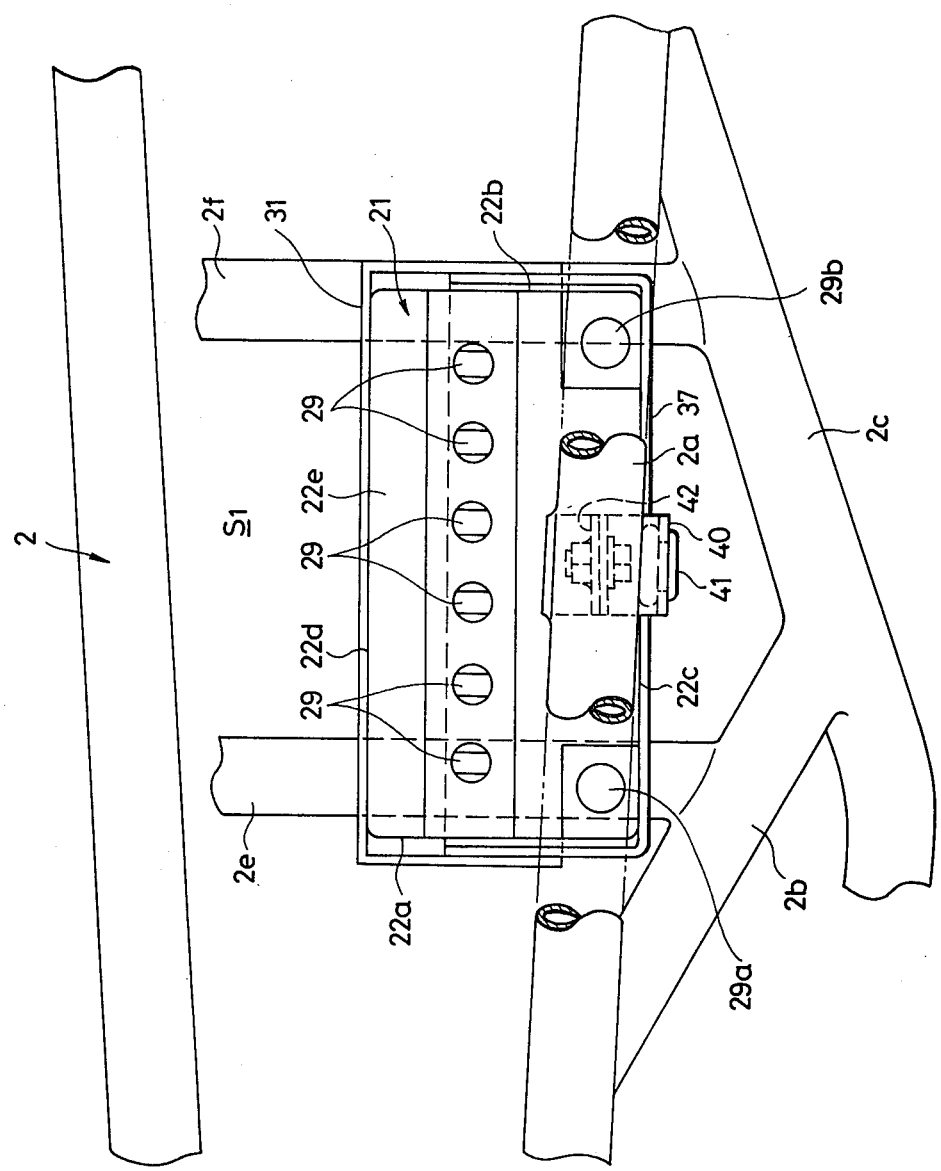

The box-shaped body 22 of the battery 21 is smaller in lateral width than the space $S_1$ between the above-described right and left members; i.e., the box-shaped body 22 has a width which can be included in the space $S_1$. The plan view of the box-shaped body 22 is rectangular, being long in the horizontal direction. The external appearance is as shown in FIGS. 3 and 4. The middle part 24 of the bottom 23 of the body 22 protrudes downwardly, and the bottom 24a of the middle part 24 is flat. Bottoms 25 and 26 which are provided respectively in front of and at the rear of the middle part 24 are shallower than the bottom 24a. Accordingly, the height to the substantially flat wall 22e of the body 22 is small at the front and rear parts 27 and 28 and is larger at the middle part 24.

The bottoms 25 and 26 of the front and rear parts 27 and 28 are flat. The inner edges of the bottoms 25 and 26 merge with the front and rear walls 24b and 24c of the middle part 24 which are perpendicular to the bottoms 25 and 26. The outer edges of the bottoms 25 and 26 merge with the vertical front and rear walls 22a and 22b of the body 22 which are perpendicular to the bottoms 25 and 26. The right and left walls 22d and 22c of the body 22 are substantially flat.

Six cells are incorporated in the battery 21, which are arranged horizontally. The output voltage of each cell is 2 V. Therefore, the output voltage of the battery 21 is 12 V because the six cells are connected in series. Two cells are arranged in the front and rear parts 27 and 28 whose bottoms are shallow as described above, and four cells are set in the middle part. The front and rear parts are relatively shallow, while the middle part is deep; however, the cells are equal to one another in volume. The plugs 29 of the cells are provided in the upper wall 22e in such a manner that they are arranged in the longitudinal direction. Power terminals 29a and 29b are provided in the front and rear portions of the upper wall, respectively. The middle part 24 of the battery body 22 is equal to or slightly larger than the conventional rectangular parallelepiped battery in height, and the longitudinal length of the battery body 22 is equal to or slightly larger than that of the conventional battery. In this embodiment, the cells are arranged in the longitudinal direction; however, they may be arranged in the lateral direction as well.

The obliquely extending members 2b and 2c are bridged by cross members 2e and 2f at the mid points, respectively. The distance between the cross members 2e and 2f and the longitudinally extending members 2a is much larger than the height of the front and rear parts 27 and 28 of the battery body 22.

A battery stay 31 is provided in the form of a box-shaped frame which is upwardly opened. The battery stay 31 has a middle part 32 which extends downwardly and is set between the cross members 2e and 2f. The battery stay 31 further has bottoms 33 and 34 which are provided before and after the middle part 32. The bottoms 33 and 34 are placed on the cross members 2e and 2f, respectively. The outer edges of the front and rear bottoms 33 and 34 merge with the front and rear walls 35 and 36 which extend vertically, and the outsides thereof are open. A battery case 37 symmetrical in configuration with the battery stay is inserted into the battery stay. The battery stay has cushioning wavy supporting parts 37a, 37b and 37c which are similar in configuration to the bottom of the stay and are placed on the inner surface of the bottom 32a of the middle part 32 and the inner surfaces of the bottoms 33 and 34. The stay 31 is made up of two parts which are joined together by placing the bottoms one on another. The case 37 is also made up of two parts similarly as in the case of stay 31. As the rear cross member 2f is lower in level than the front cross member 2e, the rear wavy part 37c is supported on a middle bottom 34a. The above-described case 37 is provided by pressing a steel plate or by molding using synthetic resin. In this embodiment, the flat part which is provided after the middle wavy part 37b is fixedly secured to the middle part bottom 32a of the stay with a bolt and nut 38.

A hinge 39 is provided on the lower surface of the central portion of the middle part bottom 32a. The lower end of an L-shaped band 40 which is set before the battery case 37 is connected to the hinge 39. An elastic part 41 made of rubber or the like is provided at the middle of the band 40. The upper portion 40a of the band is bent and a locking hole is formed in the upper portion 40a. A bracket 42 extends downwardly from the upper member 2a described above, and a nut 43 is fixedly secured to the bracket 42.

The battery 21 is accommodated in the case 37 and the stay 31. The bottoms 25, 24a and 26 are supported on the wavy bottoms 37a, 37b and 37c of the case 37, respectively. Thereafter, the band 40 is set on the outer wall of the case 37 and the elastic part 41 is set on the outer wall 22c of the body 22. Then, the upper portion 40a is placed on the bracket 42, and a bolt 44 is engaged with the nut 43.

As a result, the battery is accommodated in the inverted-triangular V-shaped space S. As the middle part protrudes downwardly and the front and rear bottoms are shallow, the battery can be set in agreement with the V-shaped space. As the cross members can be moved upwardly, the V-shaped space can be effectively utilized. Since it is unnecessary to provide a space large in the height direction between the battery bottom and the bottom of the V-shaped space, the height of the frame and accordingly the height of the motorcycle itself can be reduced. In addition, the V-shaped structure of the frame can be made small. Owing to the above-described configuration of the battery, the latter is compact, which contributes to the effective utilization of the available space on the motorcycle.

Although the invention has been described with reference to a battery for a motorcycle; it should be noted that the technical concept of the invention is applicable to other types of batteries.

What is claimed is:

1. A battery for a vehicle comprising substantially planar side walls, a front wall, a rear wall, a top wall, and a bottom wall, said bottom wall having first and second spaced apart surfaces disposed in substantially the same plane and a third surface disposed between said first and second surfaces and located in the further plane displaced vertically from said plane of said first and second surfaces with said further plane being displaced further away from said top wall than said plane of said first and second surfaces and front and rear substantially vertical bottom walls joining said first surface and said second surface to said third surface respectively.

2. A battery as claimed in claim 1, said third surface and said front and rear bottom walls together comprising a protrusion extending downwardly from said first and second surfaces, said protrusion being of a size so as to be received within a reduced volume region of a frame of said vehicle.

3. A battery as claimed in claim 2, said reduced volume region of said vehicle frame comprising an inverted triangular region of a motorcycle frame.

4. A battery as claimed in claim 1, further including battery stay means comprising a box-shaped frame generally following the contours of said battery and having means (33, 34) fittingly engaged with frame members (2e, 2f) of said vehicle.

5. A battery as claimed in claim 4, said stay means being made up of a pair of stay halves.

6. A battery as claimed in claim 4, further including case means of a configuration symmetrical with said battery stay means and positioned betwen said stay means and said battery.

7. A battery as claimed in claim 6, said case means including waved cushion portions between at least said first, second and third surfaces and confronting surfaces of said stay means.

8. A battery as claimed in claim 6, further including band means attached to an outer wall of said case means and to a portion of a frame of said vehicle.

* * * * *